United States Patent
Siwak et al.

(10) Patent No.: US 12,127,563 B2
(45) Date of Patent: Oct. 29, 2024

(54) DISPENSING BAKED GOOD CONTAINER ASSEMBLY AND METHOD

(71) Applicants: Samuel Siwak, Clayton, MO (US);
Benjamin Siwak, Clayton, MO (US);
Molly Siwak, Clayton, MO (US)

(72) Inventors: Samuel Siwak, Clayton, MO (US);
Benjamin Siwak, Clayton, MO (US);
Molly Siwak, Clayton, MO (US)

( * ) Notice: Subject to any disclaimer, the term of this patent is extended or adjusted under 35 U.S.C. 154(b) by 0 days.

(21) Appl. No.: 17/844,312

(22) Filed: Jun. 20, 2022

(65) Prior Publication Data

US 2023/0404086 A1    Dec. 21, 2023

(51) Int. Cl.
*A21C 1/14* (2006.01)
*B65B 25/16* (2006.01)
*B65D 83/00* (2006.01)

(52) U.S. Cl.
CPC .............. *A21C 1/144* (2013.01); *B65B 25/16* (2013.01); *B65D 83/0055* (2013.01)

(58) Field of Classification Search
CPC ...... A21C 1/144; B65B 25/16; B65D 83/0055
See application file for complete search history.

(56) References Cited

U.S. PATENT DOCUMENTS

| | | | | |
|---|---|---|---|---|
| 3,285,202 | A * | 11/1966 | Macmanus | A23G 3/2069 285/260 |
| 4,205,765 | A * | 6/1980 | May | A21C 15/005 222/107 |
| 10,492,500 | B1 * | 12/2019 | Siwak | B65D 83/0055 |
| 11,383,914 | B2 * | 7/2022 | Fisher | B65D 25/04 |
| 2008/0041878 | A1 * | 2/2008 | Day | A21C 15/005 222/107 |
| 2015/0129609 | A1 * | 5/2015 | Ciecorka | B65B 35/38 222/107 |
| 2017/0341820 | A1 * | 11/2017 | Folkmar | B65D 33/2558 |
| 2019/0373911 | A1 * | 12/2019 | Brown | A23G 3/28 |

* cited by examiner

*Primary Examiner* — Donnell A Long
(74) *Attorney, Agent, or Firm* — Jay J. Hoette; The Small Patent Law Group, LLC

(57) ABSTRACT

A dispensing baked good container assembly includes a container having a pastry bag extend between an upper portion and a lower portion. The pastry bag is flexible. The pastry bag has an internal cavity configured to hold baked good ingredients. The lower portion has a lower dispensing opening at a dispensing tip at a bottom of the pastry bag through which the baked good ingredients are dispensed. The dispensing baked good container assembly includes a support ring coupled to the upper portion of the pastry bag. The support ring is rigid or semi-rigid to support the upper end of the pastry bag and form a funnel providing access to the internal cavity.

31 Claims, 4 Drawing Sheets

DISPENSING BAKED GOOD CONTAINER ASSEMBLY AND METHOD

BACKGROUND OF THE INVENTION

The subject matter herein relates generally to dispensing baked good container assemblies and methods.

Baked goods are typically made by dispensing dough onto a cooking sheet. However, ingredients are typically measured out individually and mixed into dough in a mixing bowl using an electric mixer or a hand mixer. Such measuring and mixing process is time consuming and messy. Some known methods include the use of pre-packaged ingredients, where the user simply pours the contents of the box or bag into the bowl and then adds water and then mixes the ingredients in the bowl. While pre-packaging saves time, the process is still messy and dirties bowls and other mixing utensils. Some known methods include the use of a pastry bag or piping bag to dispense the dough onto the baking sheet. For example, the mixed dough may be transferred into the pastry bag. It may be difficult to transfer the dough into the pastry bag. Additionally, such techniques require having the pastry bag available on hand when baking to utilize.

A need remains for a dispensing baked good container that may be manufactured in a cost effective and reliable manner and that is easy to use.

BRIEF DESCRIPTION OF THE INVENTION

In one embodiment, a dispensing baked good container assembly is provided and includes a container having a pastry bag extend between an upper portion and a lower portion. The pastry bag is flexible. The pastry bag has an internal cavity configured to hold baked good ingredients. The lower portion has a lower dispensing opening at a dispensing tip at a bottom of the pastry bag through which the baked good ingredients are dispensed. The dispensing baked good container assembly includes a support ring coupled to the upper portion of the pastry bag. The support ring is rigid or semi-rigid to support the upper end of the pastry bag and form a funnel providing access to the internal cavity.

In another embodiment, a dispensing baked good container assembly is provided and includes a container having a flexible pastry bag. The pastry bag has an internal cavity configured to hold baked good ingredients. The pastry bag extends between an upper portion and a lower portion. The upper portion has a top and a funnel extending from the top to a neck. The lower portion extends from the neck. The lower portion has a conical section at a bottom of the lower portion. The lower portion has a lower dispensing opening at a dispensing tip at the bottom of the pastry bag through which the baked good ingredients are dispensed. The dispensing baked good container assembly includes a support ring coupled to the upper portion of the pastry bag. The support ring is rigid or semi-rigid to support the upper end of the pastry bag and holds the funnel open to receive water in the internal cavity for mixing with the baked good ingredients prior to dispensing through the lower dispensing opening.

In a further embodiment, a method of manufacturing a dispensing baked good container assembly is provided. The method includes forming a pastry bag with a front panel and a rear panel joined at a peripheral edge. The pastry bag has an internal cavity between the front panel and the rear panel. The pastry bag has a conical section with a dispensing tip at a bottom of the pastry bag. The pastry bag has a funnel at a top of the pastry bag. The method couples a support ring to the pastry bag at the funnel. The support ring is rigid or semi-rigid to hold a shape of the funnel. The method loads baked good ingredients into the internal cavity of the pastry bag through the funnel. The method seals the pastry bag with the baked good ingredients in the internal cavity. The pastry bag is configured to be opened at the top to receive water for mixing with the baked good ingredients in the pastry bag.

DETAILED DESCRIPTION OF THE INVENTION

Figure 1:
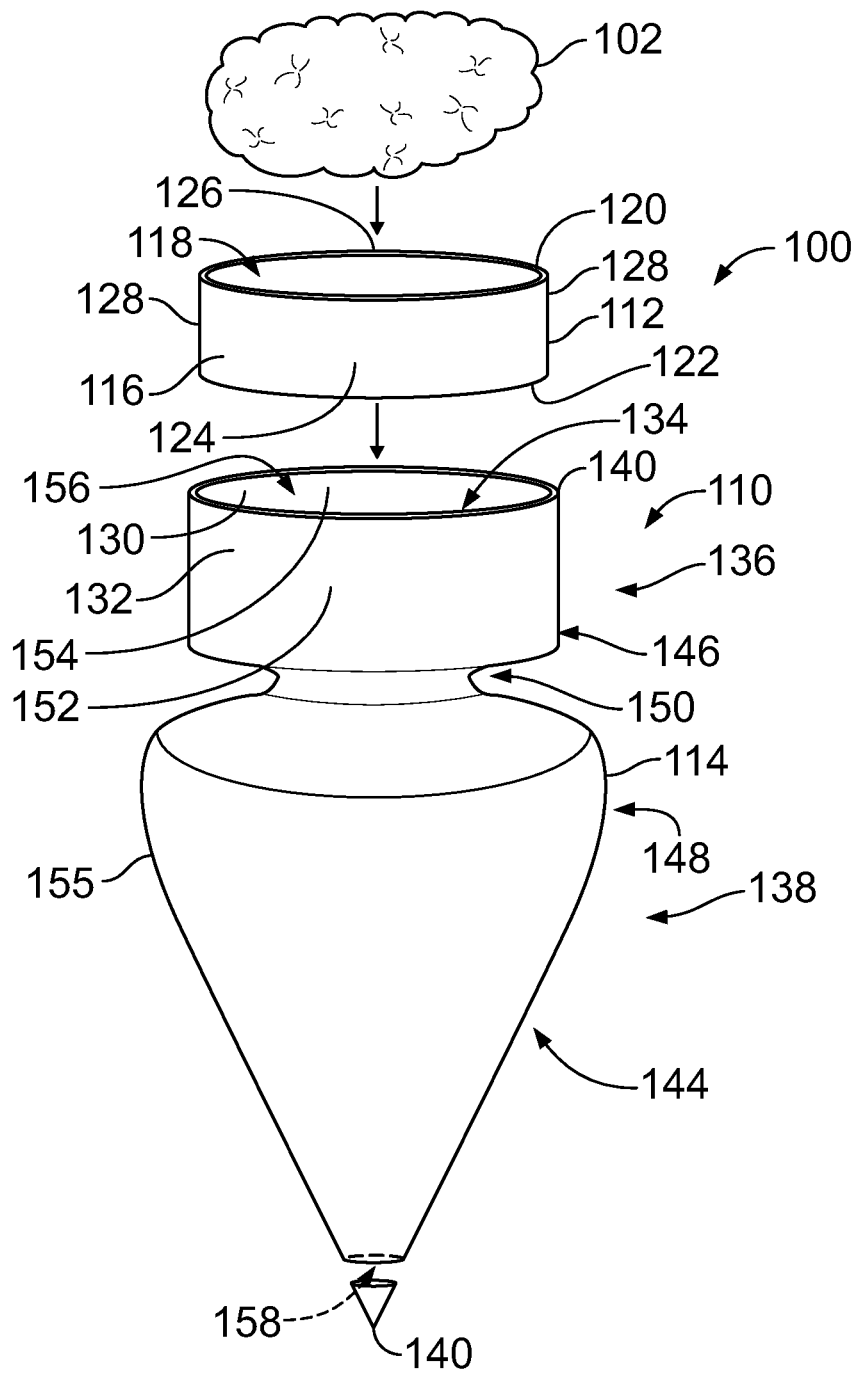
FIG. 1 is an exploded view of a dispensing baked good container assembly in accordance with an exemplary embodiment.
Figure 2:
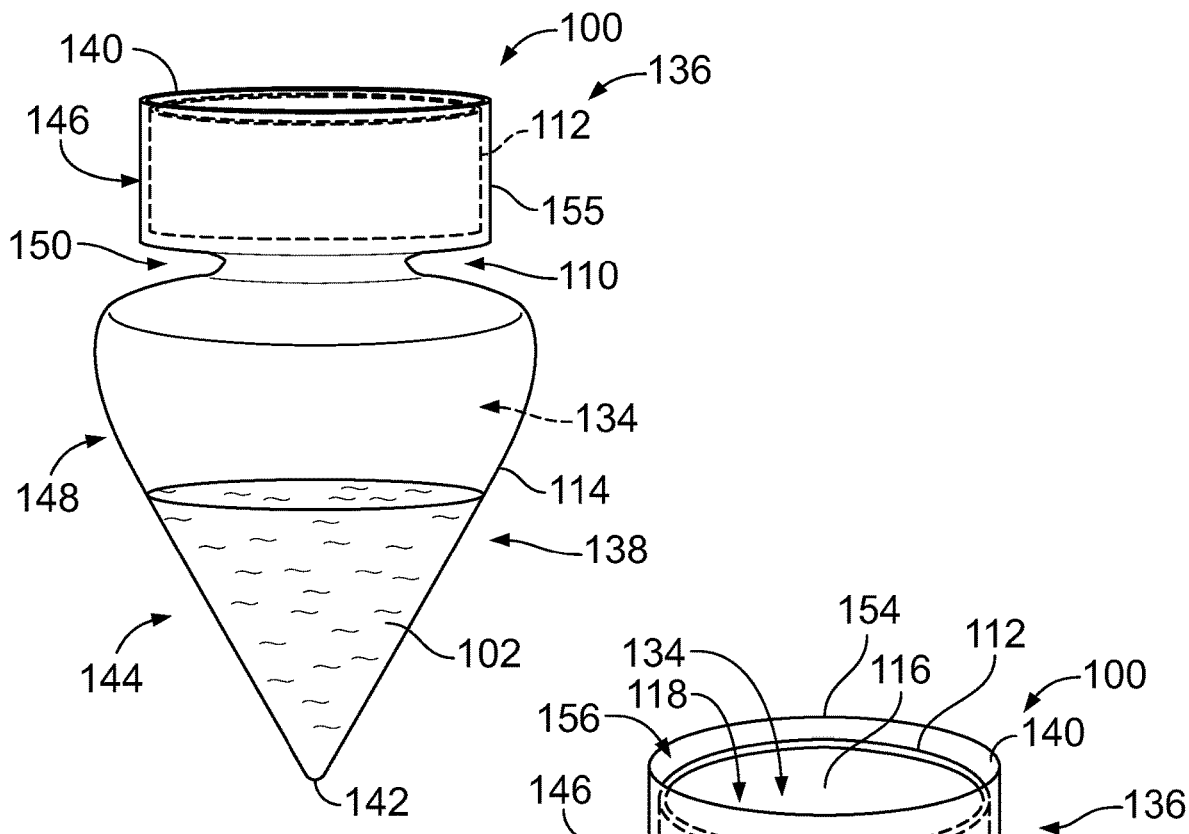
FIG. 2 is a front perspective view of the dispensing baked good container assembly in accordance with an exemplary embodiment in a closed state.
Figure 3:
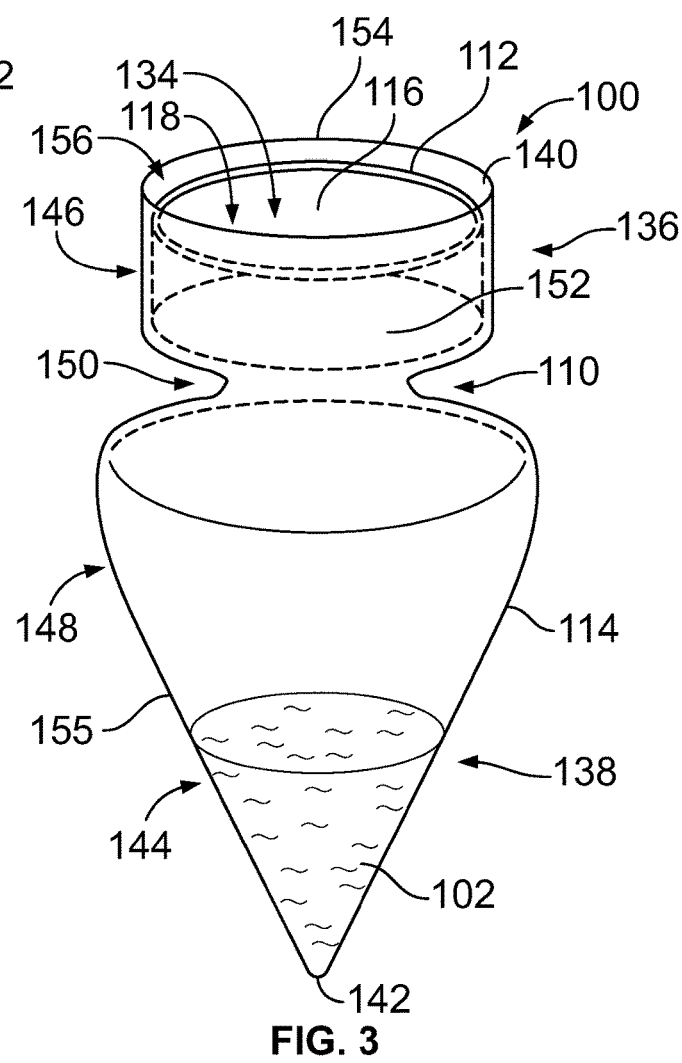
FIG. 3 is a front perspective view of the dispensing baked good container assembly in accordance with an exemplary embodiment in an open state.
Figure 4:
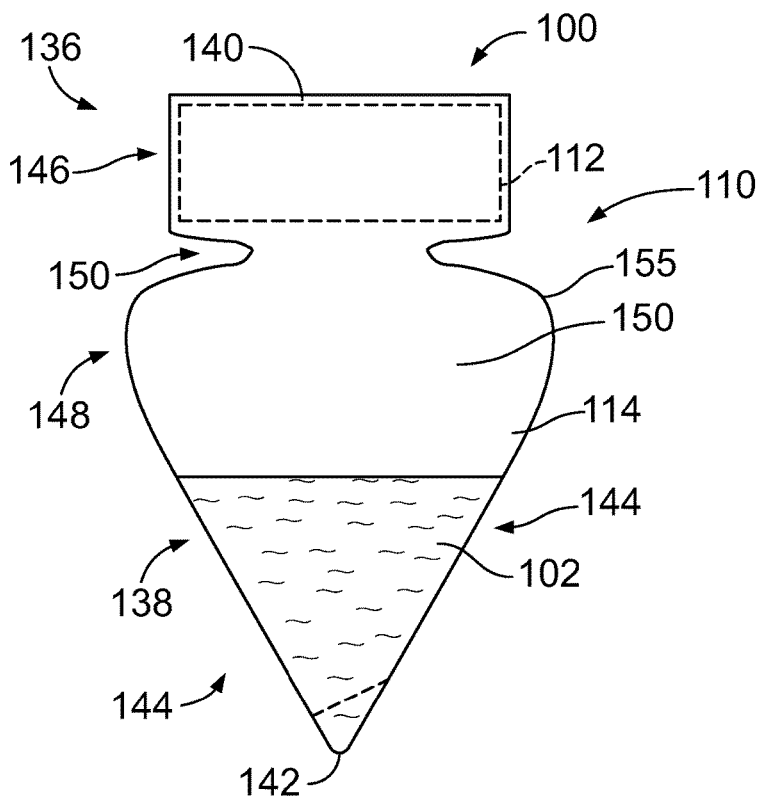
FIG. 4 is a front view of the dispensing baked good container assembly in the closed state in accordance with an exemplary embodiment.
Figure 5:
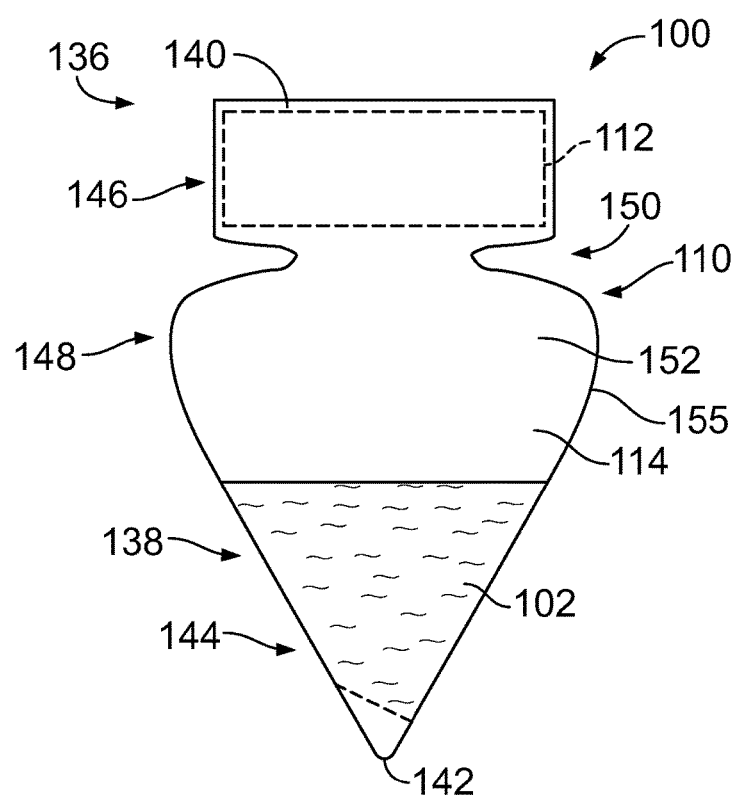
FIG. 5 is a rear view of the dispensing baked good container assembly in the open state in accordance with an exemplary embodiment.

FIG. 1 is an exploded view of a dispensing baked good container assembly 100 in accordance with an exemplary embodiment. FIG. 2 is a front perspective view of the dispensing baked good container assembly 100 in accordance with an exemplary embodiment in a closed state. FIG. 3 is a front perspective view of the dispensing baked good container assembly 100 in accordance with an exemplary embodiment in an open state. FIG. 4 is a front view of the dispensing baked good container assembly 100 in the closed state. FIG. 5 is a rear view of the dispensing baked good container assembly 100 in the open state.

The dispensing baked good container assembly 100 may be referred to hereinafter as a container assembly 100. The container assembly 100 is used for dispensing baked good ingredients 102 for baking, such as cookies, pet treats, and the like. The container assembly 100 provides a package that holds the baked good ingredients 102 from manufacturer to consumer. The container assembly 100 provides a structure for mixing and dispensing of the baked good ingredients 102. The container assembly 100 provides an easy baking experience for adults and children alike.

The container assembly 100 includes a container 110 holding the baked good ingredients 102 and a support ring 112 used to support a portion of the container 110. The container 110 includes a pastry bag 114 that holds the baked good ingredients 102. The pastry bag 114 is flexible and configured to be manipulated by the user, such as to mix and knead the baked good ingredients 102 and added liquid into dough in the pastry bag 114. The pastry bag 114 may be opened at the bottom to dispense the dough from the pastry bag 114. In an exemplary embodiment, the pastry bag 114 may be opened at the top to receive the baked good ingredients 102 and the liquid. The support ring 112 holds the pastry bag 114 open to receive the liquid. The support ring 112 is rigid or semi-rigid to define a shape for the pastry bag 114, such as a funnel shape, to receive the liquid.

When the customer is ready to use the container assembly 100 and bake the baked goods, the top of the pastry bag 114 is opened. The user manipulates the support ring 112 to open the pastry bag 114 and add liquid into the open pastry bag 114, such as through an opening of the support ring 112. The liquid is mixed with the baked good ingredients 102. The mixture is configured to be kneaded in the pastry bag 114 into dough. The dough is dispensing directly from the bottom of the pastry bag 114.

The support ring 112 includes a rigid or semi-rigid body 116 having an opening 118 through a center of the support ring 112. The support ring 112 may be manufactured from a different material from the pastry bag 114. For example, the support ring 112 may be manufactured from paper, such as a cardboard material. In alternative embodiments, the support ring 112 may be manufactured from a different material, such as plastic or metal.

The support ring 112 extends between a top 120 and a bottom 122. The opening 118 passes through the support ring 112 between the top 120 and the bottom 122. The top 120 and/or the bottom 122 may be planar. The support ring 112 includes a front 124 and a rear 126. The support ring 112 includes sides 128. In various embodiments, the support ring 112 is semi-rigid and may generally retain its shape. However, the shape of the support ring 112 may change when manipulated (for example, squeezed or otherwise apply force). The support ring 112 may have a cylindrical shape, an ovoid shape, or another shape. Optionally, the support ring 112 may be folded at the sides 128, such as to open and close the support ring 112. The sides 128 may be squeezed together to open the support ring 112 and spread the front 124 away from the rear 126. For example, the support ring 112 may be generally flat in a closed position (FIGS. 2 and 4) and may be generally round (for example, circular) in an open position (FIGS. 3 and 5). In the closed position, the opening 118 may be partially closed or completely closed. For example, the front 124 may be held against the rear 126. The opening 118 is smaller in at least one dimension in the closed position compared to the open position. When opened, the opening 118 is configured to receive the baked good ingredients 102 and the liquid. For example, the front 124 and the rear 126 may be moved relatively further from each other. The opening 118 may be larger in at least one dimension (for example, front to rear) in the open position compared to the closed position.

The support ring 112 includes an inner surface 130 and an outer surface 132. The support ring 112 has a thickness between the inner surface 130 and the outer surface 132. The support ring 112 may be thicker than the pastry bag 114 in various embodiments making the support ring more rigid than the pastry bag 114. In an exemplary embodiment, the support ring 112 is manufactured from a material having a higher elastic modulus than the material of the pastry bag 114. As such, the support ring 112 has greater stiffness than the flexible pastry bag 114. The inner surface 130 faces the opening 118. In an exemplary embodiment, the support ring 112 is received inside the pastry bag 114. The outer surface 132 faces the pastry bag 114. The outer surface 132 may be coupled to the pastry bag 114, such as using adhesive. Alternatively, the support ring 112 is located outside of the pastry bag 114. For example, the pastry bag 114 is received in the opening 118 and coupled to the inner surface 130 of the support ring 112. In alternative embodiments, the support ring 112 is integral with the pastry bag 114, such as being co-molded or co-extruded.

In an exemplary embodiment, the pastry bag 114 is manufactured from flexible packaging material. The pastry bag 114 may be manufactured from a plastic material, such as polyethylene or other polymer material. The pastry bag 114 may be made from one or more plastic films or sheets that are formed into a predetermined shape. In an exemplary embodiment, the pastry bag 114 includes a cavity 134. The baked good ingredients 102 are received in the cavity 134. The baked good ingredients 102 may be mixed with the liquid in the cavity 134 to make the dough. In various embodiments, the pastry bag 114 may have a generally conical shape, particularly at the bottom of the pastry bag 114. The pastry bag 114 may have a funnel shape, particularly at the top of the pastry bag 114, to load the baked good ingredients 102, the liquid or other materials into the pastry bag 114.

The pastry bag 114 extends between a top 140 and a bottom 142. The pastry bag 114 has an upper portion 136 at the top 140 and a lower portion 138 at the bottom 142. In an exemplary embodiment, the pastry bag 114 has a conical section 144 at the lower portion 138 of the pastry bag 114 extending to a dispensing tip at the bottom 142. The conical section 144 is generally conical shaped tapering at the bottom 142 to the dispensing tip. In an exemplary embodiment, the pastry bag 114 has a funnel 146 at the upper portion 136 of the pastry bag 114. The funnel 146 may be held open by the support ring 112 to load the baked good ingredients 102 and the liquid into the conical section 144. The conical section 144 holds the baked good ingredients 102. After mixing, the baked good ingredients 102 are dispensed from the conical section 144 at the bottom 142. In the illustrated embodiment, the pastry bag 114 has a bulbed section 148 at the top of the lower portion 138 above the conical section 144. The bulbed section 148 extends from a necked section 150 at a bottom of the upper section. The necked section 150 forms part of the funnel 146. The necked section 150 is narrower than the upper portion of the funnel 146 and narrower than the bulbed section 148. The necked section 150 is located below the support ring 112 in the illustrated embodiment. The necked section 150 provides an area for the user to hold the pastry bag 114. The pastry bag 114 may have other shapes in alternative embodiments, such as having the entire pastry bag 114 having a conical shape from the top 140 to the bottom 142.

In an exemplary embodiment, the pastry bag 114 includes a front panel 152 and a rear panel 154. The front and rear panels 152, 154 may be separate panels secured or sealed together at a peripheral edge 155 of the pastry bag 114. The peripheral edge 155 defines the shape of the pastry bag 114, such as the conical section 144 and the funnel 146. In an exemplary embodiment, the front and rear panels 152, 154 are sealed at the top 140 and/or the bottom 142. For example, after the baked good ingredients 102 are loaded in the cavity 134 the top 140 and/or the bottom 142 may be sealed for shipping and storage. During use, the top 140 of the pastry bag 114 is opened (FIGS. 3 and 5). For example, the top 140 may be cut or torn open or the seal may be broken, such as by pulling the front and rear panels 152, 154 apart. The top 140 includes an upper opening 156 when opened. The upper opening 156 is open to the funnel 146 and the cavity 134. The liquid may be loaded into the cavity 134 through the upper opening 156. The support ring 112 is manipulated to hold the upper opening 156 in an open position to receive the liquid. For example, the support ring 112 may be squeezed into an open position to hold the upper portion 136 of the pastry bag 114, and the upper opening 156, in an open position. After the liquid is mixed with the baked good ingredients 102, the bottom 142 of the pastry bag 114 may be removed, such as being cut or torn off from the pastry bag 114, to form a lower dispensing opening 158. The dough is dispensed through the lower dispensing opening 158.

The bulbed section 148 is configured to be located below the funnel 146. In an exemplary embodiment, the bulbed section 148 has a non-uniform diameter. For example, the bulbed section 148 may be narrower at the top and narrower at the bottom while being wider in the middle of the bulbed section 148. Other shapes are possible in alternative embodiments. In an exemplary embodiment, the bulbed section 148 is wider than the funnel 146. The bulbed section 148 is an enlarged area that allows the pastry bag 114 to be gathered and/or twisted when dispensing the baked good ingredients 102. For example, the extra material in the bulbed section 148 allows the pastry bag 114 to be twisted at the bulbed section 148 below the funnel 146 and the support ring 112 without putting undue stress and strain on the support ring 112.

The conical section 144 has a decreasing diameter from the top to the bottom of the conical section 144. The conical section 144 extends to the dispensing tip at the bottom 142. A portion of the pastry bag 114 at the bottom 142 may be removed by cutting or tearing off the bottom 142 of the pastry bag 114 to form the dispensing opening 158 at the bottom 142 for dispensing the baked good ingredients 102. Optionally, a decorating tip or other type of nozzle may be coupled to the bottom 142 of the pastry bag 114 for dispensing the baked good ingredients 102.

Liquid, such as water, milk or other liquid may be poured into the pastry bag 114 through the funnel 146. The funnel 146 directs the liquid into the conical section 144 of the pastry bag 114 to mix with the baked good ingredients 102. The baked good ingredients 102 and the liquid are configured to be mixed by massaging the ingredients 102 by hand, in the pastry bag 114, into dough that may be dispensed from the pastry bag 114 through the lower dispensing opening 158.

Figure 6:
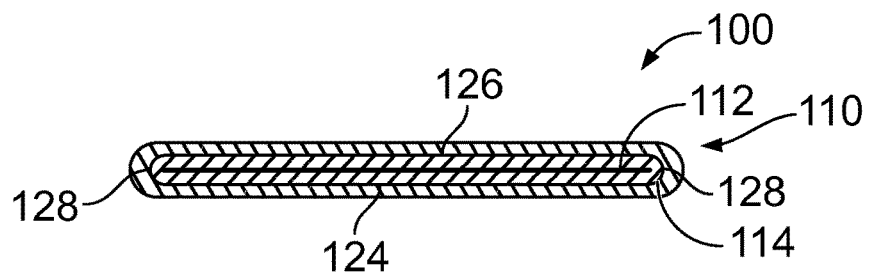
FIG. 6 is a cross-sectional view of a portion of the dispensing baked good container assembly showing the pastry bag coupled to the support ring in accordance with an exemplary embodiment in a closed state.
Figure 7:
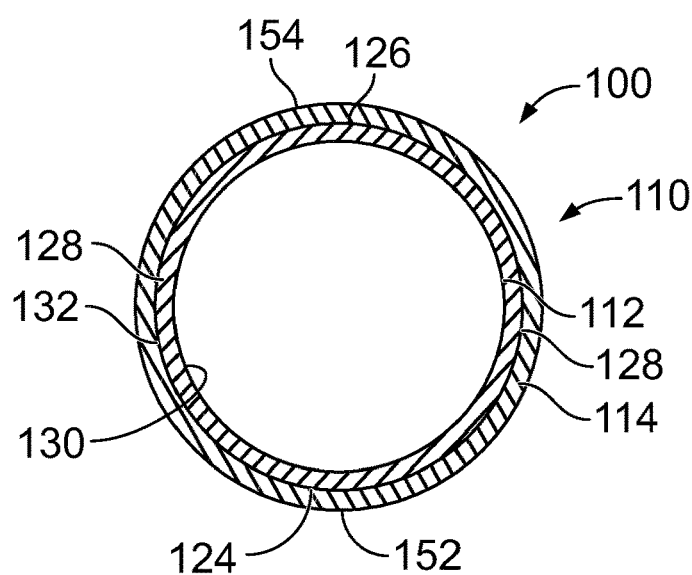
FIG. 7 is a cross-sectional view of a portion of the dispensing baked good container assembly showing the pastry bag coupled to the support ring in accordance with an exemplary embodiment in an open state.
Figure 8:
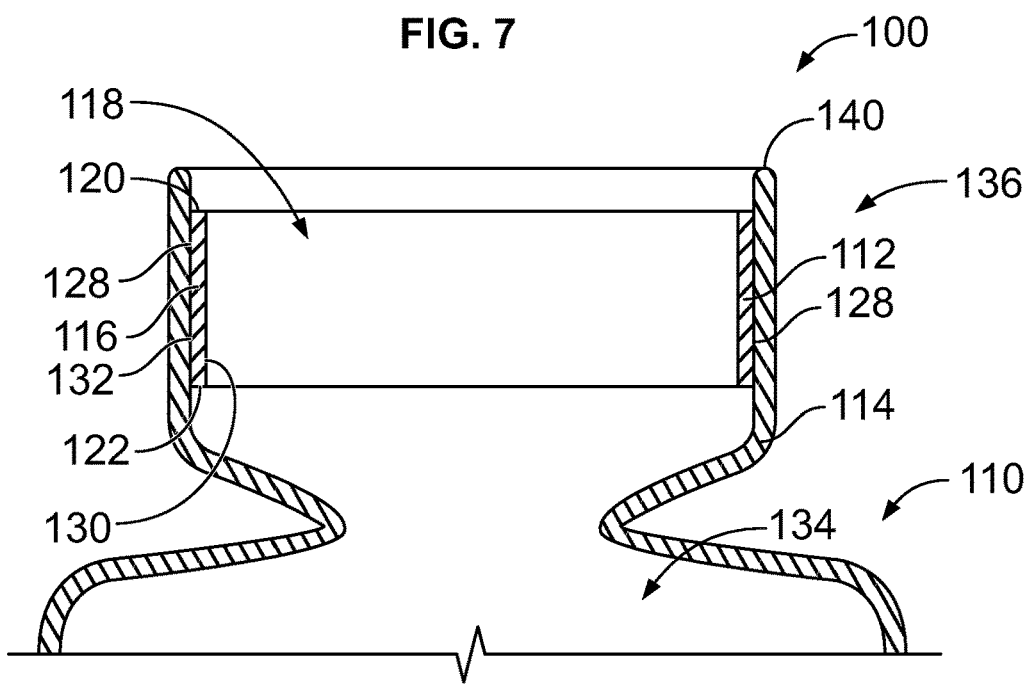
FIG. 8 is a cross-sectional view of a portion of the dispensing baked good container assembly showing the pastry bag coupled to the support ring in accordance with an exemplary embodiment

FIG. 6 is a cross-sectional view of a portion of the dispensing baked good container assembly 100 showing the pastry bag 114 coupled to the support ring 112 in accordance with an exemplary embodiment in a closed state. FIG. 7 is a cross-sectional view of a portion of the dispensing baked good container assembly 100 showing the pastry bag 114 coupled to the support ring 112 in accordance with an exemplary embodiment in an open state. FIG. 8 is a cross-sectional view of a portion of the dispensing baked good container assembly 100 showing the pastry bag 114 coupled to the support ring 112 in accordance with an exemplary embodiment.

In an exemplary embodiment, the outer surface 132 of the support ring 112 is coupled to the interior of the pastry bag 114. In alternative embodiments, the pastry bag 114 may be coupled to the inner surface 130 of the support ring 112. The pastry bag 114 may be adhered to the support ring 112. However, the pastry bag 114 may be coupled to the container 110 by other means or processes in alternative embodiments. The front 124, the rear 126 and the sides 128 of the support ring 112 engage the pastry bag 114 to hold the shape of the pastry bag 114. The support ring 112 presses outward against the pastry bag 114 to hold the shape of the pastry bag 114, such as to hold the front panel 152 away from the rear panel 154 to open the cavity 134.

The support ring 112 is rigid or semi-rigid and has shape retaining characteristics. In an exemplary embodiment, the support ring 112 is cardboard and the pastry bag 114 is plastic and flexible. The support ring 112 is manipulated between the closed and open positions to change the shape of the pastry bag 114. The support ring 112 is used to hold the pastry bag 114 open to form the funnel for filling the pastry bag 114 with the liquid. In the closed state, the support ring 112 may be elongated along an axis and have a generally flat shape. In the open state, the support ring 112 may have a generally round shape. The support ring 112 is wider in at least one direction, such as a lateral direction (perpendicular to the flat axis), in the open position.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A dispensing baked good container assembly comprising:
   a container having a pastry bag extending between an upper portion and a lower portion, the pastry bag being flexible, the pastry bag having an internal cavity configured to hold baked good ingredients, the lower portion having a lower dispensing opening at a dispensing tip at a bottom of the pastry bag through which the baked good ingredients are dispensed; and
   a support ring coupled to the upper portion of the pastry bag, the support ring being rigid or semi-rigid to support the upper end of the pastry bag and form a funnel providing access to the internal cavity, wherein the support ring has shape-retaining characteristics, wherein the shape-retaining characteristics of the support ring allow the support ring to hold the pastry bag open without external pressure from a user.

2. The dispensing baked good container assembly of claim 1, wherein the material of the support ring has a higher elastic modulus than the material of the pastry bag.

3. The dispensing baked good container assembly of claim 1, wherein the support ring includes an inner surface and an outer surface, the outer surface pressing outward against the pastry bag to form the funnel.

4. The dispensing baked good container assembly of claim 1, wherein the support ring is manufactured from a cardboard material.

5. The dispensing baked good container assembly of claim 1, wherein the support ring is manufactured from a plastic material, the pastry bag being manufactured from a plastic material.

6. The dispensing baked good container assembly of claim 1, wherein the support ring has a thickness greater than a thickness of the pastry bag.

7. The dispensing baked good container assembly of claim 1, wherein the support ring is separate and discrete from the pastry bag, the support ring being loaded into the internal cavity and being coupled to an inner surface of the pastry bag.

8. The dispensing baked good container assembly of claim 1, wherein the support ring includes an opening providing access to the internal cavity.

9. The dispensing baked good container assembly of claim 1, wherein the support ring is manipulated from a first shape to a second shape, the support ring being larger in at least one dimension in the second shape compared to the first shape.

10. The dispensing baked good container assembly of claim 1, wherein the support ring is movable between a closed position and an open position, the support ring moved to the open position to form the funnel.

11. The dispensing baked good container assembly of claim 1, wherein the upper portion of the pastry bag includes the funnel extending from a top of the pastry bag to a neck, the lower portion extending from the neck, the lower portion having a conical section at the bottom of the lower portion.

12. The dispensing baked good container assembly of claim 1, wherein the pastry bag includes a front panel and a rear panel secured to the front panel at a peripheral edge, the internal cavity being defined between the front panel and the rear panel.

13. The dispensing baked good container assembly of claim 1, wherein a top of the pastry bag is configured to be opened to form an upper receiving opening, the upper receiving opening being held open by the support ring to provide access to the upper portion, the upper receiving opening configured to receive water configured to be mixed with the baked good ingredients in the internal cavity to form dough, and wherein the bottom of the pastry bag at the dispensing tip is configured to be opened to allow dispensing of the dough.

14. A dispensing baked good container assembly comprising:
   a container having a flexible pastry bag, the pastry bag having an internal cavity configured to hold baked good ingredients, the pastry bag extending between an upper portion and a lower portion, the upper portion having a top and a funnel extending from the top to a neck, the lower portion extending from the neck, the lower portion having a conical section at a bottom of the lower portion, the lower portion having a lower dispensing opening at a dispensing tip at the bottom of the pastry bag through which the baked good ingredients are dispensed; and
   a support ring coupled to the upper portion of the pastry bag, the support ring being rigid or semi-rigid to support the upper end of the pastry bag and hold the funnel open to receive water in the internal cavity for mixing with the baked good ingredients prior to dispensing through the lower dispensing opening, wherein the support ring has shape-retaining characteristics, wherein the shape-retaining characteristics of the support ring allow the support ring to hold the pastry bag open without external pressure from a user.

15. The dispensing baked good container assembly of claim 14, wherein the material of the support ring has a higher elastic modulus than the material of the pastry bag.

16. The dispensing baked good container assembly of claim 14, wherein the support ring includes an inner surface and an outer surface, the outer surface pressing outward against the pastry bag to form the funnel.

17. The dispensing baked good container assembly of claim 14, wherein the support ring is manufactured from a cardboard material.

18. The dispensing baked good container assembly of claim 14, wherein the support ring is manufactured from a plastic material, the pastry bag being manufactured from a plastic material.

19. The dispensing baked good container assembly of claim 14, wherein the support ring has a thickness greater than a thickness of the pastry bag.

20. The dispensing baked good container assembly of claim 14, wherein the support ring is separate and discrete from the pastry bag, the support ring being loaded into the internal cavity and being coupled to an inner surface of the pastry bag.

21. The dispensing baked good container assembly of claim 14, wherein the support ring includes an opening providing access to the internal cavity.

22. The dispensing baked good container assembly of claim 14, wherein the support ring is manipulated from a first shape to a second shape, the support ring being larger in at least one dimension in the second shape compared to the first shape.

23. The dispensing baked good container assembly of claim 14, wherein the support ring is movable between a closed position and an open position, the support ring moved to the open position to form the funnel.

24. The dispensing baked good container assembly of claim 14, wherein the pastry bag includes a front panel and a rear panel secured to the front panel at a peripheral edge, the internal cavity being defined between the front panel and the rear panel.

25. The dispensing baked good container assembly of claim 14, wherein the top of the pastry bag is configured to be opened to form an upper receiving opening, the upper receiving opening being held open by the support ring to provide access to the upper portion, the upper receiving opening configured to receive the water configured to be mixed with the baked good ingredients in the internal cavity to form dough, and wherein the bottom of the pastry bag at the dispensing tip is configured to be opened to allow dispensing of the dough.

26. A method of manufacturing a dispensing baked good container assembly, the method comprising:
   forming a pastry bag with a front panel and a rear panel joined at a peripheral edge, the pastry bag having an internal cavity between the front panel and the rear panel, the pastry bag having a conical section with a dispensing tip at a bottom of the pastry bag, the pastry bag having a funnel at a top of the pastry bag;

coupling a support ring to the pastry bag at the funnel, the support ring being rigid or semi-rigid to hold a shape of the funnel, wherein the support ring has shape-retaining characteristics to hold the funnel open;

loading baked good ingredients into the internal cavity of the pastry bag through the funnel; and sealing the pastry bag with the baked good ingredients in the internal cavity, wherein the pastry bag is configured to be opened at the top to receive water for mixing with the baked good ingredients in the pastry bag.

27. The method of claim 26, wherein said coupling a support ring comprises coupling the support ring to an inner surface of the pastry bag.

28. The method of claim 26, wherein said coupling a support ring comprises adhering the support ring to the pastry bag.

29. The method of claim 26, further comprising squeezing the support ring to change the shape of the support ring from a generally flat shape to a generally round shape.

30. The method of claim 26, further comprising:
opening a top of the pastry bag;
partially filling the internal cavity through the funnel of the pastry bag with water; and
mixing the water with the baked good ingredients to form dough.

31. The method of claim 30, further comprising opening the dispensing tip at the bottom of the pastry bag to dispense the dough from the pastry bag.

\* \* \* \* \*